US012809455B2

(12) United States Patent
Stellmach et al.

(10) Patent No.: US 12,809,455 B2
(45) Date of Patent: Nov. 24, 2026

(54) ACCELERATED GAZE-SUPPORTED MANUAL CURSOR CONTROL

(71) Applicant: Microsoft Technology Licensing, LLC, Redmond, WA (US)

(72) Inventors: Sophie Stellmach, Seattle, WA (US); Casey Leon Meekhof, Redmond, WA (US); James R. Tichenor, Seattle, WA (US); David Bruce Lindsay, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 499 days.

(21) Appl. No.: 17/566,585

(22) Filed: Dec. 30, 2021

(65) Prior Publication Data

US 2022/0121281 A1 Apr. 21, 2022

Related U.S. Application Data

(63) Continuation of application No. 15/986,529, filed on May 22, 2018, now abandoned.

(51) Int. Cl.
*G06F 3/01* (2006.01)
*G06F 3/04812* (2022.01)
*G06F 3/04842* (2022.01)

(52) U.S. Cl.
CPC .......... *G06F 3/013* (2013.01); *G06F 3/04812* (2013.01); *G06F 3/04842* (2013.01)

(58) Field of Classification Search
None
See application file for complete search history.

(56) References Cited

U.S. PATENT DOCUMENTS 8,558,759 B1 * 10/2013 Prada Gomez ......... G06F 3/017 345/619
2005/0243054 A1 * 11/2005 Beymer .................. G06F 3/013 382/103
2012/0272179 A1 * 10/2012 Stafford ................ G06F 3/0482 345/157
2015/0261295 A1 * 9/2015 Lee ........................ G06F 3/0486 345/157
2016/0048223 A1 * 2/2016 Taguchi ................ G06F 3/0346 345/157
2017/0060230 A1 * 3/2017 Faaborg .............. G06F 3/04883
2017/0068338 A1 * 3/2017 Hatanaka ............... B60K 37/06
2017/0068418 A1 * 3/2017 Tanaka .................. G06F 3/0488
(Continued)

OTHER PUBLICATIONS

"Office Action Issued in European Patent Application No. 19721459.6", Mailed Date: May 10, 2022, 8 Pages.
(Continued)

*Primary Examiner* — Kieu D Vu
*Assistant Examiner* — David V Luu
(74) *Attorney, Agent, or Firm* — Ray Quinney & Nebeker P.C.; John O. Carpenter

(57) ABSTRACT

A method for improving user interaction with a virtual environment includes measuring a first position of a user's gaze relative to the virtual environment, receiving a system engagement input, presenting a guidance cursor at the first position, receiving a target engagement input and decoupling the guidance cursor from the user's gaze, receiving a movement input, and translating the guidance cursor based on the movement input.

20 Claims, 9 Drawing Sheets

(56) References Cited

U.S. PATENT DOCUMENTS

2018/0173902 A1* 6/2018 Shogaki ................ G06F 3/1454
2018/0232064 A1* 8/2018 Vroom ................ G06F 3/03543
2019/0361521 A1 11/2019 Stellmach et al.

OTHER PUBLICATIONS

"Office Action Issued in European Patent Application No. 19726283.5", Mailed Date: May 4, 2022, 8 Pages.
"Office Action Issued in European Patent Application No. 19721459.6", Mailed Date: Aug. 2, 2023, 6 Pages.
"Office Action Issued in European Patent Application No. 19726283.5", Mailed Date: Mar. 23, 2023, 8 Pages.
Notice of Allowance Received for European Application No. 19726283.5, mailed on Nov. 7, 2023, 7 Pages.
U.S. Appl. No. 15/958,686, filed Apr. 20, 2018.
Decision to grant a European patent pursuant to Article 97(1) received in European Application No. 19726283.5, mailed on Mar. 7, 2024, 2 pages.

* cited by examiner

ACCELERATED GAZE-SUPPORTED MANUAL CURSOR CONTROL

This application is a continuation of U.S. patent application Ser. No. 15/986,529, filed May 22, 2018, which is hereby incorporated by reference in its entirety.

BACKGROUND

Background and Relevant Art

With emerging ubiquitous user interfaces (UI), such as smart devices and innovative head-mounted display technology, usage of such UIs becomes more common among non-specialists. Interaction with the UIs may be improved by making the interaction more intuitive and subtle. A well-established input paradigm is point-and-click or in more general terms: point-and-command. In emerging natural UIs, a command could for instance be triggered by different voice commands, hand gestures, or touch input.

An effortless and subtle way to indicate a user's context is to take advantage of gaze tracking data to infer a user's current reference frame. Several problems arise with this approach though, as eye tracking and additional commands are asynchronous (i.e., the eye gaze is usually preceding manual inputs and may have moved on to new targets upon finishing recognition of the manual input). In addition, due to technological constraints of the tracking system as well as physiological constraints of the human visual system, the computed gaze signal may be jittery and show offsets compared to the actual eye gaze. This increases the problem of reliably referring to small and closely positioned targets. Thus, an overall problem arises about how such multimodal inputs can be appropriately combined.

BRIEF SUMMARY

In some embodiments, a method for improving user interaction with a virtual environment includes measuring a first position of a user's gaze relative to the virtual environment, receiving a system engagement input, presenting a guidance cursor at the first position, receiving a target engagement input and decoupling the guidance cursor from the user's gaze, receiving a movement input, and translating the guidance cursor based on the movement input.

In other embodiments, a method for improving user interaction with a virtual environment includes measuring a first position of a user's gaze relative to the virtual environment, presenting a guidance cursor at the first position, receiving a movement input having a movement direction, and snapping the guidance cursor on a first selectable object in the virtual environment where the first selectable object is in the movement direction relative to the first position.

In yet other embodiments, a method for improving user interaction with a virtual environment includes measuring a first position of a user's gaze relative to the virtual environment, presenting a guidance cursor at the first position, measuring a second position of the user's gaze relative to the virtual environment, and when the second position is beyond a threshold distance from the guidance cursor, translating the guidance cursor through the virtual environment to the second position.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1:
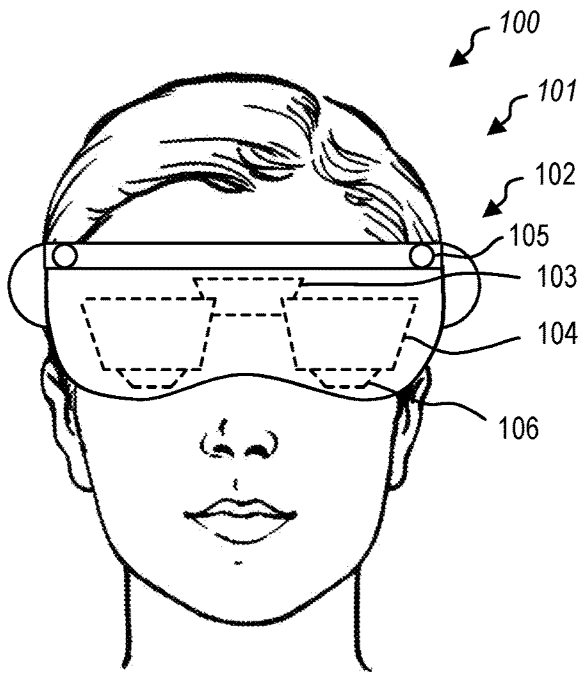
FIG. 1 is a perspective view of a head-mounted display (HMD) including a waveguide, according to at least one embodiment of the present disclosure.

This disclosure generally relates to devices, systems, and methods for visual user interaction with virtual environments. More specifically, the present disclosure relates to improving interaction with virtual elements using gaze-informed manual cursor control. In some embodiments, visual information may be provided to a user by a near-eye display. A near-eye display may be any display that is positioned near a user's eye, either to supplement a user's view of their surroundings, such as augmented or mixed reality devices, or to replace the user's view of their surroundings, such as virtual reality devices. In some embodiments, an augmented reality or mixed reality device may be a head-mounted display (HMD) that presents visual information to a user overlaid on the user's view of their surroundings. For example, the visual information from the HMD may be combined with ambient or environment light to overlay visual information, such as text or images, on a user's surroundings.

In some embodiments, the user's field of view may be at least partially encompassed by a waveguide through which the user views their surroundings. The waveguide may direct display light from a display device to the user's field of view. The waveguide may guide the display light before out-coupling the light. Upon out-coupling the light, the waveguide may combine the visual information of the display light with ambient light from the user's surroundings to deliver the visual information to the user.

Visual information including virtual environments may be positioned in the user's field of view on the waveguide or other near-eye display. A gaze-tracking device of the HMD may image at least a portion of the user's eye (such as the pupil, the iris, or the sclera) and identify a direction or location of the user's gaze. The direction or location of the user's gaze may then be extrapolated to a position on the near-eye display and/or in the virtual environment. A cursor may be associated with the gaze location to allow the user to highlight or select a position in the virtual environment by looking at that position. In other embodiments, a gaze-tracking device may include a gyroscope, an accelerometer, a plurality of sensors to triangulate position, or other devices that allow for the measurement of the orientation and/or position of the HMD relative to the virtual environment. For example, the user's "gaze" may be a ray cast forward from the HMD to approximate the user's gaze by approximating the user's head position and orientation as their gaze direction. In some examples, such a head-tracking "gaze" may be simpler than an eye-tracking gaze, as the user remains free to glance around in their field of view without inadvertently moving a gaze position cursor. In other examples, an eye-tracking gaze may be more intuitive as a user will naturally look at whatever object is of interest to the user during interactions with the virtual environment.

In some embodiments, gaze-informed manual cursor control, either by eye-tracking gaze or by head-tracking gaze, may allow for rapid manipulation of a user's perspective in a virtual environment. In other embodiments, gaze-informed manual cursor control may be employed in combination with manual, voice, peripheral, or other inputs to provide different scales of movement and manipulation for both speed and precision.

FIG. 1 is a perspective view of a user 100 wearing a HMD 101. In some embodiments, the HMD 101 may have a housing 102 that contains one or more processors, storage devices, power supplies, audio devices, display devices, cameras, communication devices, or combinations thereof, that receive, collect, store, process, or calculate information that is provided to the user. For example, a display device 103 may be positioned optically adjacent a waveguide(s) or other near eye display 104 to provide visual information to the near eye display 104, which may, in turn, be presented in the user's field of view by the near eye display 104.

In some embodiments, the HMD 101 may have a near eye display 104 positioned near the user 100 to direct visual information to the user 100. The HMD 101 may include a single near eye display 104, a separate near eye display 104 for each of the user's eyes (i.e., two near eye displays 104), or more than two near eye displays 104 to provide visual information over a larger field of view.

In some embodiments, the HMD 101 may include one or more cameras 105 that may image the user's physical environment. For example, the camera(s) 105 may be a visible light camera(s) 105 that may image the surrounding environment. A processor may perform image recognition routines on the visible light image to detect and recognize elements in the surrounding environment, such as physical objects or people. In other examples, the camera(s) 105 may be depth sensing camera(s) that may create a depth image of the surrounding environment. For example, the camera 105 may be a time-of-flight camera, a structured light camera, stereo cameras, or other cameras that may use visible, infrared, ultraviolet, or other wavelengths of light to collect three-dimensional information about the surrounding environment. In at least one example, the camera(s) 105 may be gesture recognition cameras that allow the HMD 101 to recognize and interpret hand gestures performed by the user 100 in front of the HMD 101.

In some embodiments, the HMD 101 may further include a gaze-tracking device 106 positioned in the HMD 101 to track a direction of the user's gaze. The gaze-tracking device 106 may include a camera or a plurality of cameras to image the user's eyes. In other words, the gaze-tracking device 106 may image the user's pupil, iris, sclera, other portions of the user's eye, or combinations thereof to calculate the direction the user is looking. In some embodiments, the gaze-tracking device 106 may measure and/or calculate the x- and y-components of the user's gaze. In other embodiments, the gaze-tracking device 106 may include a gyroscope, an accelerometer, a plurality of sensors to triangulate position, or other devices that allow for the measurement of the orientation and/or position of the HMD relative to the virtual environment. For example, the user's "gaze" may be a ray cast forward from the HMD to approximate the user's gaze by approximating the user's head position and orientation as their gaze direction.

Figure 2:
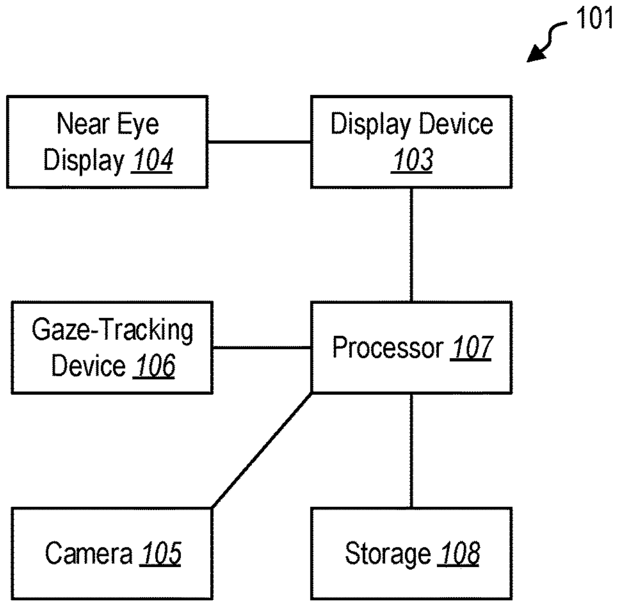
FIG. 2 is a schematic representation of the HMD of FIG. 1, according to at least one embodiment of the present disclosure.

FIG. 2 is a schematic representation of the HMD 101. The display device 103 in communication with the near eye display 104 may be in data communication with a processor 107. Similarly, the camera 105 and gaze-tracking device 106 may be in data communication with the processor 107. The processor 107 may further be in data communication with a storage device 108. The storage device 108 may be a hardware storage device, such as a platen-based storage device, a solid-state storage device, or other non-transitory or long-term storage device. The storage device 108 may have instructions stored thereon to perform one or more methods or portions of a method described herein.

Figure 3:
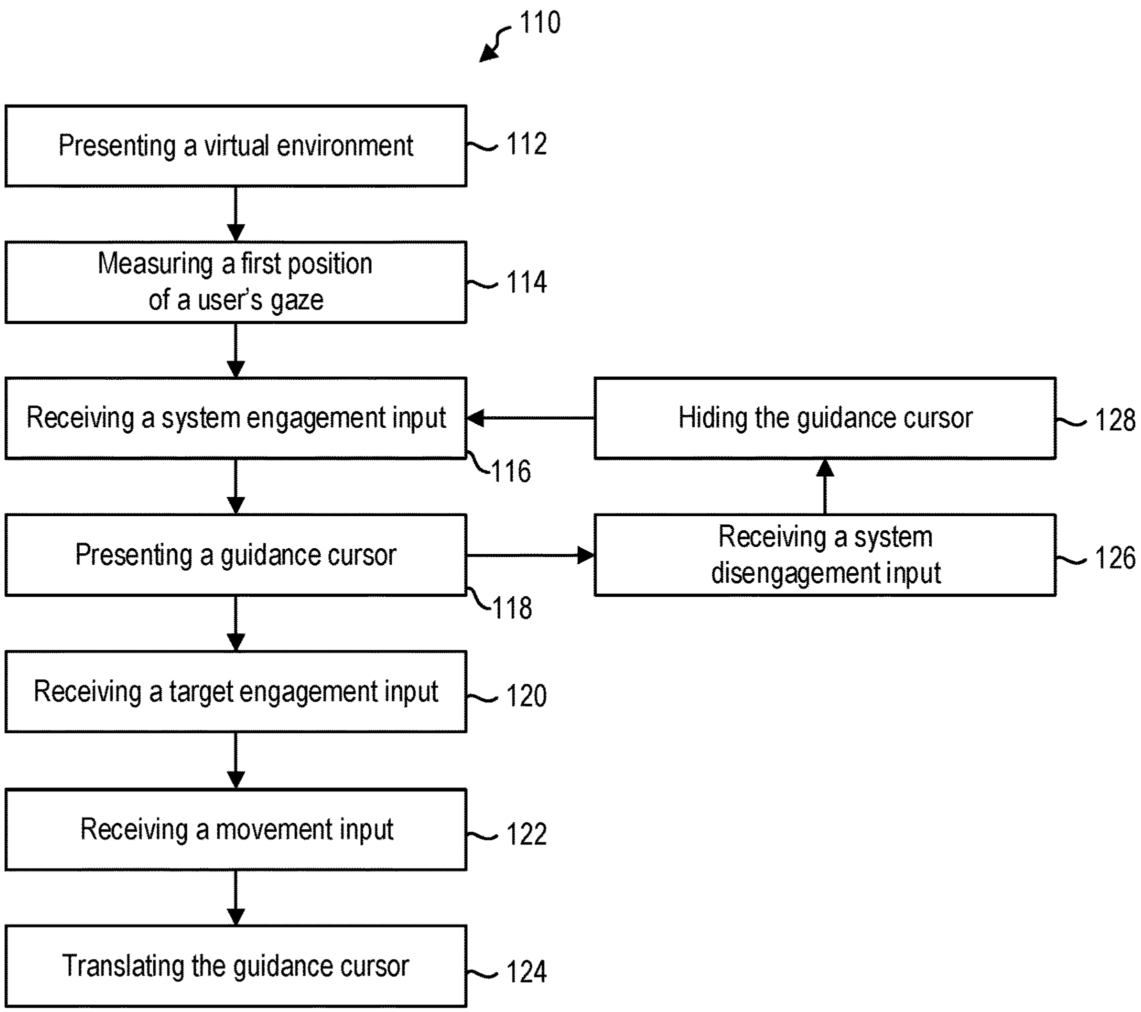
FIG. 3 is a flowchart illustrating a method of interacting with a virtual environment, according to at least one embodiment of the present disclosure.

FIG. 3 is a flowchart illustrating a method 110 of interacting with a virtual environment. The method 110 may include presenting a virtual environment to a user at 112. In some embodiments, the virtual environment may be a three-dimensional space generated by the HMD or other computing device in communication with the HMD. In other embodiments, the virtual environment may be part of a shared environment. For example, a mixed reality HMD may present a virtual environment in combination with a surrounding physical environment of the user. In such embodiments, the HMD may measure the surrounding physical environment of the user using, for example, the cameras on the HMD or other sensors to impart information of the surrounding physical environment into a virtual environment to create a shared environment. The HMD may then use the shared environment to position a virtual element in a virtual environment relative to a physical element of the surrounding physical environment.

While the present disclosure described interaction with the virtual environment through a HMD, it should be understood that in other embodiments, the virtual environment may be presented on another display, such as a laptop, tablet, desktop, large format, or other display in communication with a processor and/or a gaze-tracking device. For example, the methods and systems described herein may be equally applicable to a user interacting with a large format display on a wall of a conference room. The user may control cursor positions within a virtual environment using a gaze-tracking device and other input devices in communication with the large format display. In other examples, a laptop, smartphone, tablet, or other personal electronic device may have a front facing camera that may function as a gaze-tracking device to allow gaze-based movement and/or manipulation of virtual elements by a user interacting with the laptop, smartphone, tablet, or other personal electronic device. In yet other examples, a laptop, smartphone, tablet, or other personal electronic device may have a front facing camera that may function as a gaze-tracking device to allow gaze-based movement and/or manipulation of virtual elements by a user interacting with another display, such as a large format display on a wall of conference room.

The method 110 may include measuring a first position of a user's gaze location at 114. The first position may be measured by using a gaze-tracking device described herein to measure the position of either the user's gaze based on eye-tracking or the user's gaze based on heading tracking. At this point in the method 110, no marker or cursor is presented to the user to indicate a position of the user's gaze location. The first position of the user's gaze location is measured by the gaze-tracking device without reporting the first position to the user to minimize distraction or interference with the user's experience with the virtual environment.

The method 110 may further include receiving system engagement input from an input device at 116 and subsequently presenting a guidance cursor at the first position at 118. In some embodiments, the input device may be a gesture recognition device, such as the camera(s), in data communication with the processor of the HMD. In other embodiments, the input device may be a voice recognition device, such as a microphone, in data communication with the processor of the HMD. In yet other embodiments, the input device may be a peripheral controller, such as a six degree-of-freedom (6 DOF) controller or other motion-sensing controller, in data communication with the processor of the HMD. In yet other embodiments, the input device may be an input of a touch-sensing device, trackpad, mouse, keyboard or other conventional human interface device (HID) of a computer.

In some embodiments, the system engagement input may be a one-handed gesture. For example, the system engagement input may be the user raising a hand into a field of view of the user and/or the gesture recognition device. In another embodiment, the system engagement input may be a two-handed gesture, such as the user raising two hands into a field of view of the user and/or the gesture recognition device. In yet other embodiments, the system engagement input may be a voice input, such as a voice recognition device detecting and identifying the user stating "engage" or other system engagement input. In further embodiments, the system engagement input may be a peripheral controller input. For example, the system engagement input may be the user raising a 6 DOF motion controller in front of the user. In other examples, the system engagement input may be the user depressing a first button on a peripheral controller. In yet further embodiments, the system engagement input may be a button depress or click of a touch-sensing device, trackpad, mouse, keyboard or other conventional HID.

The guidance cursor may be presented by the display device, such as on a near-eye display, upon receipt of the system engagement input. In some embodiments, the guidance cursor may have a cursor diameter. For example, the cursor diameter may define an area around the first position of the user's gaze location. In other examples, the user's gaze location may be jittery or be otherwise imprecise due to small movements or tremors of the user's eye or due to systemic limitations of the gaze-tracking device. In such examples, the guidance cursor diameter may be related to the gaze cloud of the user's gaze locations measured over a period of time. In other embodiments, the guidance cursor guidance cursor diameter may be a fixed angular width based on the user's perspective in the virtual environment. For example, the guidance cursor width may be 0.1°, 0.5°, 1.0°, or other angular widths.

The method 110 may further include receiving a target engagement input from an input device at 120, which decouples the guidance cursor from the first position and from the user's gaze location, and receiving a movement input from an input device at 122. Upon receiving the movement input, the method 110 may further include translating the guidance cursor relative to the first position based on the movement input at 124.

In some embodiments, the target engagement input may be received from the same input device as the system engagement input. For example, the system engagement input may be received from a gesture recognition device upon recognizing the user raising their hand, and the target engagement input may be received from the same gesture recognition device upon recognizing the user tapping downward with a finger of their hand. In other embodiments, the system engagement input may be received from a first input device and the target engagement input may be received from a different second input device. For example, the system engagement input may be received from a gesture recognition device upon recognizing the user raising their hand, and the target engagement input may be received from a touch-sensing device that is tapped by a user's other hand.

In some embodiments, the movement input may be received from the same input device as the target engagement input and/or the system engagement input. For example, the target engagement input may be received from a gesture recognition device upon recognizing the user tapping downward with a finger of their hand, and the movement input may be received from the same gesture recognition device upon recognizing the user moving their hand while their finger remains in the downward position. In other embodiments, the target engagement input may be received from a first input device and the movement input may be received from a different second input device. For example, the target engagement input may be received from a voice recognition device recognizing a user's voice command, and the movement input may be received from a user's finger moving across a touch-sensing device.

In some embodiments, the target engagement input may be a downward tap of a user's finger (as though to depress a button). In at least another example, the target engagement input may be a pinching motion of a user's finger and thumb together (as though to grab the virtual environment in the first position). The target engagement input may be recognized by a gesture recognition device and may set a null point or origin for the movement input. The movement input may be a movement of the user's hand relative to the null point.

For example, a user may move their hand upward (e.g., relative to the null point) to move the guidance cursor upward in the virtual environment relative to the first position. In other examples, a user may move their hand backward (e.g., toward the user and/or away from the display) to "pull" the guidance cursor toward the user. The user may then cease the target engagement input to terminate the continuous measurement of the movement input and stop moving the guidance cursor. For example, the user may lift their finger (as though releasing the button) or relax their finger and thumb (as though releasing a grasp on the virtual environment).

In some embodiments, the movement input may be received from a touch-sensing device. For example, the touch sensing device may be a single touch device, such as a conventional trackpad. For a single touch device, the movement input may be continuous input in which a user performs a target engagement input and the movement input is continuously or substantially continuously recognized by the trackpad. In at least one example, the target engagement input may be a downward tap of a user's finger on the trackpad. The target engagement input may be recognized by the trackpad and may set a null point or origin for the movement input. The movement input may be a movement of the user's hand relative to the null point on the trackpad. The user may then cease the target engagement input to terminate the continuous measurement of the movement input. For example, the user may lift their finger from the trackpad.

In some embodiments, the movement input may be provided by a motion controller, such as a 6 DOF peripheral controller or an infrared camera tracked motion controller. For example, the movement input may be continuous input in which a user performs a target engagement input and the movement input is continuously or substantially continuously recognized by the motion controller. In at least one example, the target engagement input may be a press of a button on the motion controller that is held down while inputting the movement input. The target engagement input may be recognized by a gesture recognition device and may set a null point or origin for the movement input. The movement input may be a movement of the motion controller relative to the null point.

For example, a user may move the motion controller (e.g., away from the user and/or toward the display) to "push" the guidance cursor away from the user. In other examples, a user may move the motion controller downward to move the guidance cursor downward relative to the first position. The user may then cease the target engagement input to terminate the continuous measurement of the movement input.

In some embodiments, the movement input may be voice input. For example, the movement input may be received from a voice recognition device that recognizes or interprets speech from a user. The movement input may be discrete inputs. For example, the voice recognition device may detect a percentage voice command of "move left". In other examples, the voice recognition device may detect a distance voice command of "move right two cursors", to move the cursor a distance based on the cursor diameter. In yet other examples, the voice recognition device may detect and open-ended voice command such as "begin moving upward" until the voice recognition device detects a termination voice command such as "stop".

In some embodiments, the movement input may be received from a mouse. For example, the mouse may provide a toggle input for a target engagement input, such as clicking the scroll wheel of the mouse. Clicking or holding the scroll wheel down may provide the target engagement input. The movement input may be a movement of the scroll wheel. For example, scrolling the scroll wheel forward may move the guidance cursor upward in the virtual environment. In other examples, scrolling the scroll wheel backwards may move the guidance cursor downward in the virtual environment. The user may then cease the target engagement input to terminate the continuous measurement of the movement input.

In yet other embodiments, the input device may include foot pedals, brain scan interfaces, or other input devices from the user to the processor or other computing device in communication with the HMD.

In some embodiments, the method 110 may further include a system disengagement input at 126. The system disengagement input may be the same as the system engagement input to toggle the system engagement off. For example, the system engagement input may be a click of a mouse and the system disengagement input may be a second click of the mouse. In other embodiments, the system engagement input may be a discrete command. For example, the system engagement input may be a voice command of "engage" recognized by a voice recognition system, and the system disengagement input may be a voice command of "disengage" recognized by the voice recognition system. In yet other embodiments, the system disengagement input may be the termination of the system engagement input. For example, the system engagement input may be a gesture input of the user's raising their hand recognized by a gesture recognition system, and the system disengagement input may be the termination of the raised hand when the user lowers their hand and the gesture recognition system no longer recognizes the presence of the user's hand.

Upon receiving the system disengagement input, the method 110 may further including hiding the guidance cursor at 128 to allow the user to freely view the virtual environment without the distraction and/or interference of the guidance cursor.

Figure 4:
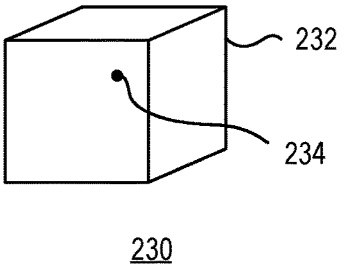
FIG. 4 is a schematic representation of a virtual environment with a first position of a user's gaze location, according to at least one embodiment of the present disclosure.
Figure 5:
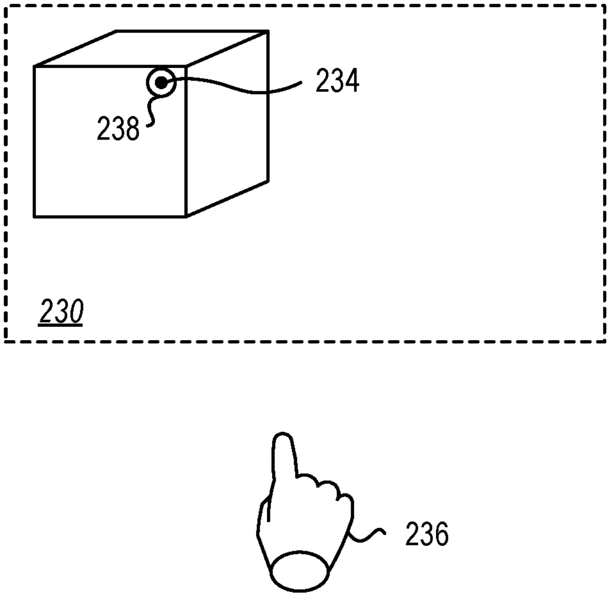
FIG. 5 is a schematic representation of a system engagement input and a guidance cursor presented in the virtual environment of FIG. 4, according to at least one embodiment of the present disclosure.

FIG. 4 through FIG. 9 illustrate an embodiment of the method described in relation to FIG. 3. FIG. 4 illustrates a virtual environment 230. The virtual environment 230 may include one or more virtual elements 232 and/or other selectable objects with which the user may interact. A gaze-tracking device, such as described in relation to FIG. 1 or FIG. 2 may detect a first position 234 of a user's gaze location. The first position 234, however, may not be presented to a user in the virtual environment until a system engagement input is received, as shown in FIG. 5.

The system engagement input may be received from an input device 236. In some embodiments, the system engagement input may be received from a gesture-recognition device, which in FIG. 5 is schematically represented as the user's hand. Upon detecting the presence of the user's hand raised toward the virtual environment 230, a guidance cursor 238 may be presented at the first position 234.

Figure 6:
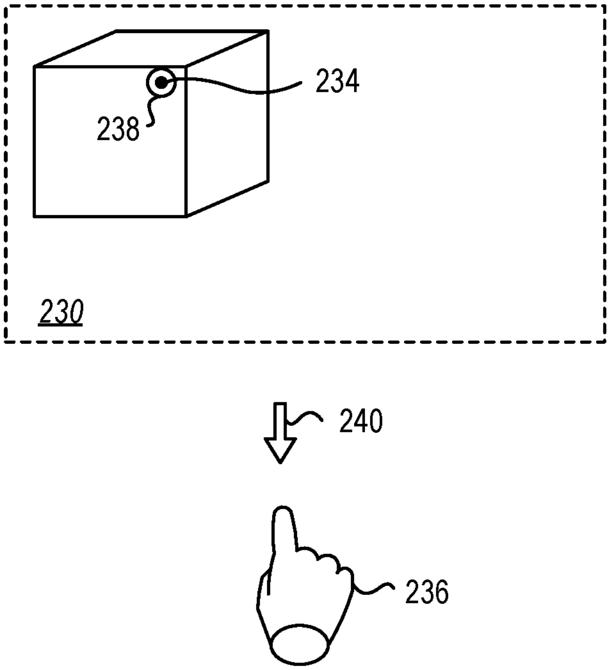
FIG. 6 is a schematic representation of a target engagement input and the virtual environment of FIG. 5, according to at least one embodiment of the present disclosure.
Figure 7:
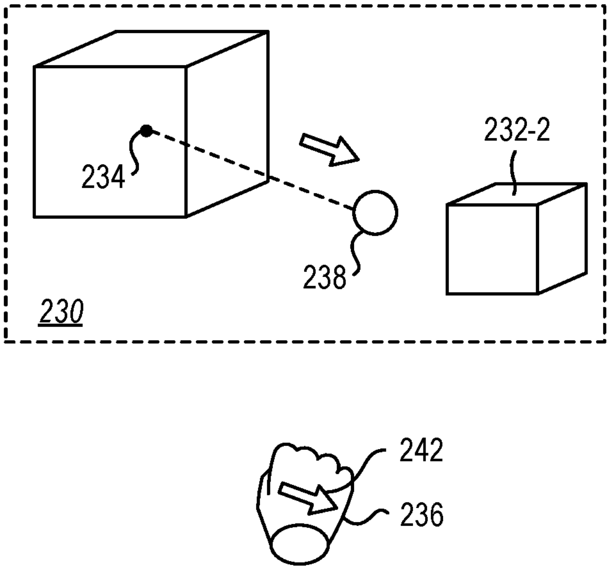
FIG. 7 is a schematic representation of a movement input and a guidance cursor movement through the virtual environment of FIG. 6, according to at least one embodiment of the present disclosure.
Figure 8:
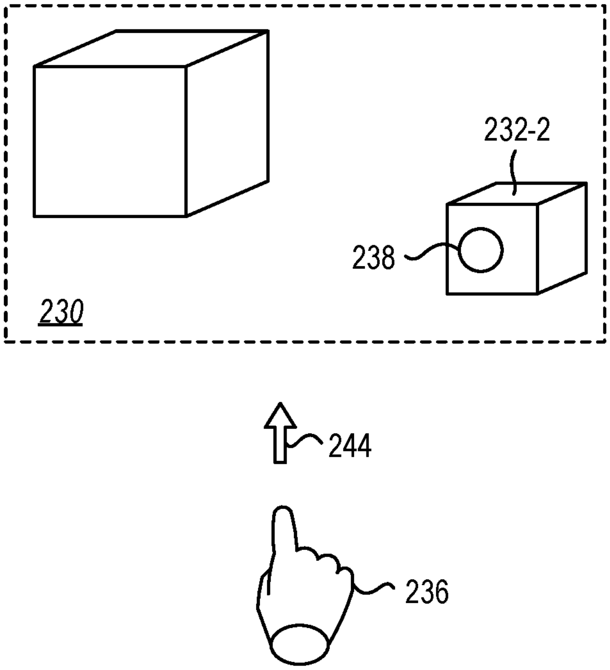
FIG. 8 is a schematic representation of a target disengagement input and the virtual environment of FIG. 7, according to at least one embodiment of the present disclosure.

FIG. 6 illustrates an embodiment of a target engagement input 240 from the input device 236. Upon receipt of the target engagement input 240, the location of the guidance cursor 238 may be decoupled from the first position 234 and/or the gaze location within the virtual environment 230, as shown in FIG. 7. The location of the guidance cursor 238 in the virtual environment 230 may be refined by a movement input 242 of the input device 236. The guidance cursor 238 may translate through the virtual environment to, for example, a second virtual element 232-2.

Upon moving the guidance cursor 238 to the desired location using the input device 236, the input device 236 may provide a target disengagement input 244. In some embodiments, the target disengagement input 244 may select the virtual element or other selectable object in the virtual environment 230. For example, the gaze location may be imprecise and not reliable allow the selection a virtual element. The target engagement input, as described herein, may allow the user to decouple the guidance cursor 238 from the gaze location and move the guidance cursor with the input device 236 to a desired selectable object, such as the second virtual element 232-2, and then select that selectable object by providing a target disengagement input 244 (e.g., releasing the target engagement input).

In some embodiments, a selectable object may be communicated to the user by changing the appearance or presentation of the guidance cursor 238 upon positioning the guidance cursor 238 over the selectable object during movement of the guidance cursor 238 using the input device 236.

For example, the guidance cursor 238 may change in shape, such as changing from a circle to a hand cursor, a cross cursor, a crosshair cursor, a diamond cursor, or other change in shape, upon moving over the second virtual element 232-2 to indicate that the second virtual element 232-2 may be "clicked on" or other be selectable. In other examples, the guidance cursor 238 may remain the same shape and change in size (e.g., pulsate larger and smaller) to indicate interactivity, change in color, gain a halo, or exhibit another visual indicator. In yet other examples, the input device may provide information to the user that the second virtual element 232-2 is selectable, such as a motion controller or touch-sensing device providing haptic feedback upon moving the guidance cursor 238 over a selectable object.

Figure 9:
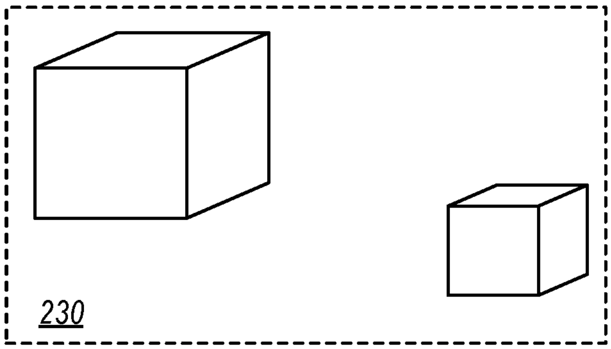
FIG. 9 is a schematic representation of a system disengagement input and the virtual environment of FIG. 8, according to at least one embodiment of the present disclosure.

FIG. 9 illustrates an example of a user lowering their hand or otherwise providing a system disengagement input to disengage the input device and hide the guidance cursor in the virtual environment 230.

As described herein, the input device may allow more precise positioning of the guidance cursor than may be possible with the gaze-tracking device alone. However, the manual positioning of the guidance cursor using the input device and not the gaze-tracking device may move the guidance cursor more slowly than the gaze location-based positioning. In some embodiments, the guidance cursor may be presented in the virtual environment and subsequently translated smoothly through the virtual environment to the user's gaze location when the user's gaze location moves sufficiently far from the guidance cursor.

Figure 10:
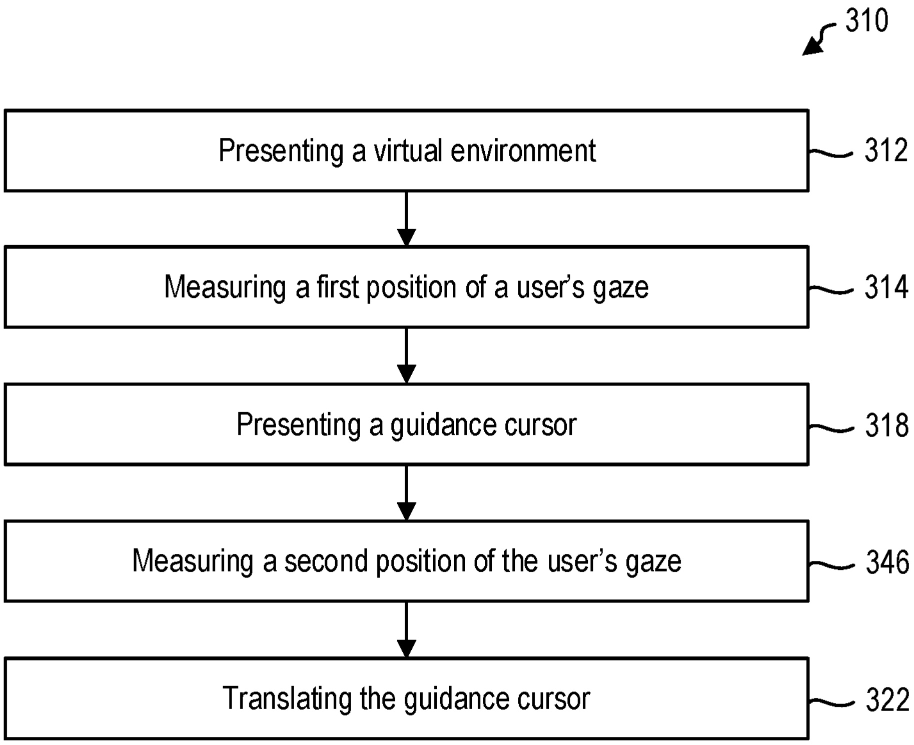
FIG. 10 is a flowchart illustrating another method of interacting with a virtual environment, according to at least one embodiment of the present disclosure.

FIG. 10 is a flowchart illustrating another method 310 of interacting with a virtual environment. In some embodiment, the method 310 may include presenting a virtual environment at 312, measuring a first position of a user's gaze location at 314, and presenting a guidance cursor at 318, similar to the method described in relation to FIG. 3. The method 310 may further include measuring a second position of the user's gaze location at 346 and, when the second position is beyond a threshold distance from the guidance cursor, translating the guidance cursor through the virtual environment to the second position at 322.

In some embodiments, the threshold distance may be at least 2° away from the guidance cursor relative to the user's perspective on the virtual environment. For example, the threshold distance may be 3° away from the guidance cursor. In other embodiments, the threshold distance may be at least 4° away from the guidance cursor. In yet other embodiments, the threshold distance may be at least 6° away from the guidance cursor (e.g., outside the user's peripheral vision when looking at the guidance cursor). In further embodiments, the threshold distance may be at least 10° from the guidance cursor.

The guidance cursor may translate through the virtual environment to the second location. A guidance cursor that instantaneously moves between locations in the virtual environment may be disorienting or fatiguing to a user over extend use sessions. A smoothly translating guidance cursor may be more intuitive to control and more comfortable for a user viewing the virtual environment.

Figure 11:
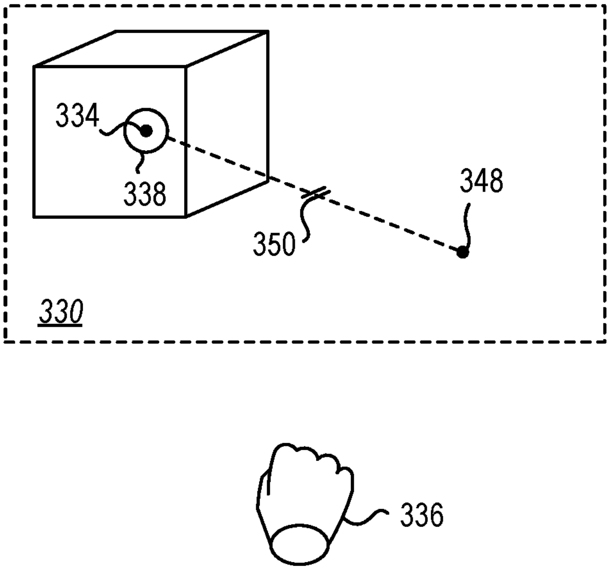
FIG. 11 is a schematic representation of a second position of a user's gaze location beyond a threshold distance in a virtual environment, according to at least one embodiment of the present disclosure.

FIG. 11 is a schematic representation of a virtual environment 330 with a guidance cursor 336 presented at a first position 334 of a user's gaze location. The user may direct their gaze toward another portion of the virtual environment. Upon detection of the user's gaze location at a second position 348 beyond a threshold distance 350, the guidance cursor may move to the second position 348.

In some embodiments, the guidance cursor 336 may initially be located at the first position 334. In other embodiments, the guidance cursor 336 may be moved relative to the first position 334 by a movement input of an input device 334. The threshold distance 350, therefore, may be calculated from the guidance cursor 336.

Figure 12:
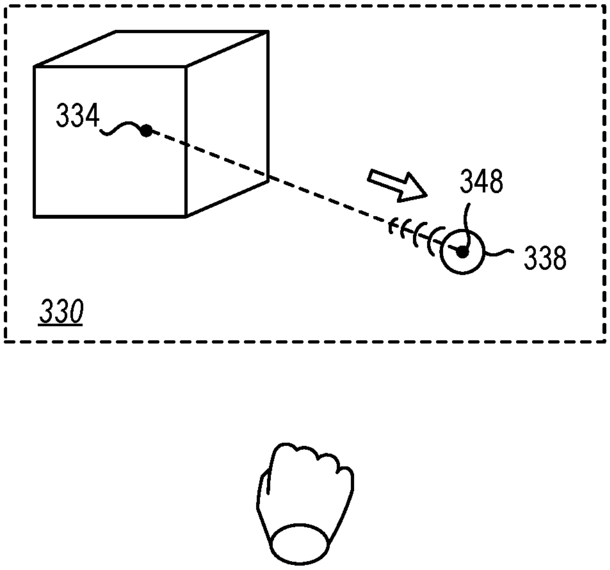
FIG. 12 is a schematic representation of a guidance cursor translating through the virtual environment of FIG. 11, according to at least one embodiment of the present disclosure.

Referring now to FIG. 12, the guidance cursor 336 may move from the first position 334 (or other starting location of the guidance cursor 336) and translate smoothly to the second location 348 through the virtual environment 330 without input from the input device 334.

In some embodiments, translating the guidance cursor 336 smoothly through the virtual environment 330 may include moving the guidance cursor with a constant velocity. In other embodiments, the guidance cursor 336 may translate with a varying speed. For example, the guidance cursor 336 may move with a maximum speed through a portion of the translation and slow upon approaching the second location 336.

In some embodiments, the guidance cursor 336 may translate at no more than 3° per second (3°/s). For example, the guidance cursor 336 may translate at a constant 3°/s. In other examples, the guidance cursor 336 may translate at 3°/s for a portion of the translation and at a slower speed for another portion of the translation. In other embodiments, the guidance cursor 336 may translate at no more than 6°/s. In yet other embodiments, the guidance cursor 336 may translate at no more than 9°/s.

In some embodiments, the guidance cursor 336 may move at the maximum speed for 90% of the translation and then slow in the last 10% approaching the second location 348. In other embodiments, the guidance cursor 336 may move at the maximum speed for 95% of the translation and then slow in the last 10% approaching the second location 348. In yet other embodiments, the guidance cursor 336 may move at the maximum speed for 98% of the translation and then slow in the last 10% approaching the second location 348.

In other embodiments, the guidance cursor 336 may translate to the second location 348 in a duration of time irrespective of the distance. For example, the guidance cursor 336 may translate to the second location 348 in no more than 0.5 seconds. In other examples, the guidance cursor 336 may translate to the second location 348 in no more than 0.25 seconds. In yet other examples, the guidance cursor 336 may translate to the second location 348 in no more than 0.1 seconds.

Figure 13:
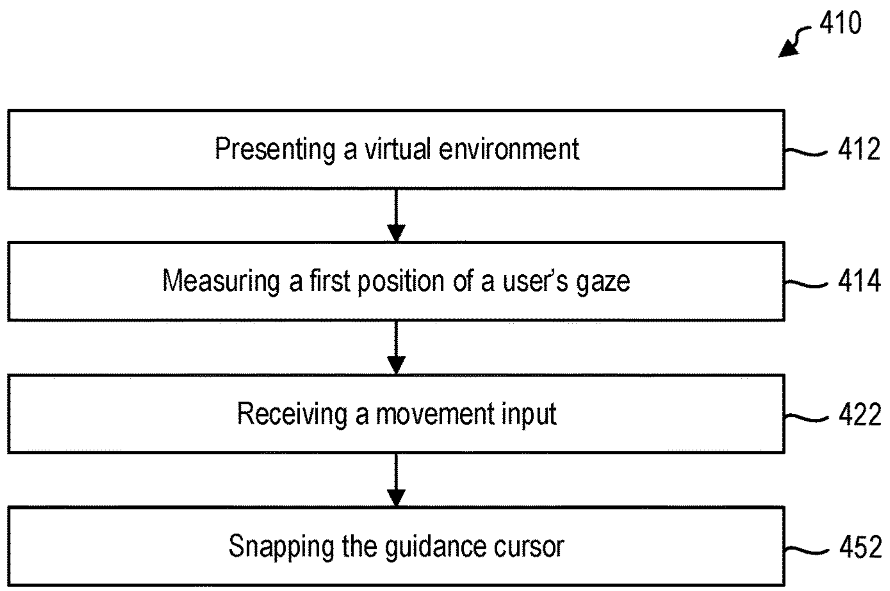
FIG. 13 is a flowchart illustrating yet another method of interacting with a virtual environment, according to at least one embodiment of the present disclosure.

To further increase the precise of the guidance cursor placement, in some embodiments, the guidance cursor may snap to a selectable object in the virtual environment. For example, FIG. 13 is a flowchart illustrating a method 410 of interacting with a virtual environment by snapping a guidance cursor between selectable objects.

In some embodiments, the method 410 may include presenting a virtual environment to a user at 412, measuring a first position of a user's gaze location at 414, and receiving a movement input at 422 similar to the method described in relation to FIG. 3. The method 410 may further include snapping a guidance cursor to a selectable virtual element in the direction of the movement input at 452. For example, a movement input having an associated direction may be received from an input device and the guidance cursor may move to the nearest selectable virtual element in that direction. The guidance cursor may be subsequently moved to other selectable virtual elements by additional movement inputs.

In some embodiments, the movement inputs may be discrete movement inputs. For example, the discrete movement input may be received from a gesture recognition device and the discrete movement input may be a pointing gesture of a user's hand or a flick gesture of the user's head in a direction. In other examples, the discrete movement input may be received from a voice recognition device and the discrete movement input may be a voice command of "move up", "step left", "snap right", or the like. In yet other examples, the discrete movement input may be received from a 6 DOF motion controller and the discrete movement input may be a tilt of the 6 DOF motion controller in a direction toward a selectable virtual element. In further examples, the discrete movement input may be received from a touch-sensing device and the discrete movement input may be a finger dragged across the touch-sensing device in a direction toward a selectable virtual element. In yet further examples, the discrete movement input may be received from other input devices that provide a directional component to a movement input.

Figure 14:
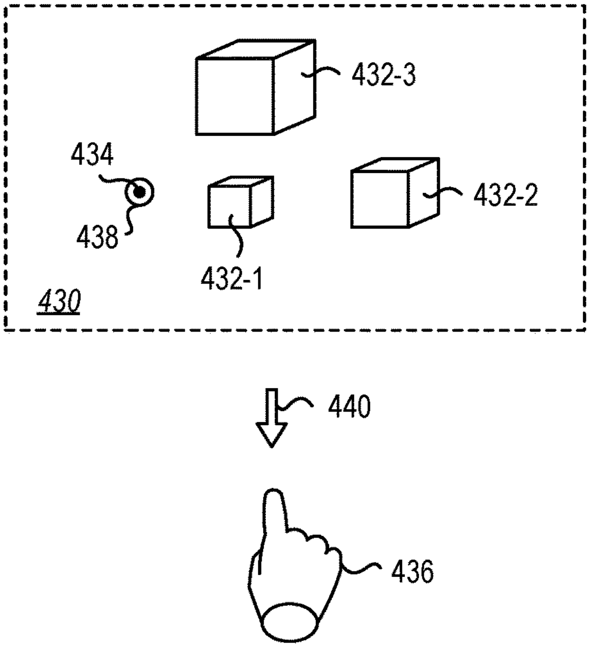
FIG. 14 is a schematic representation of an input device and virtual environment having a plurality of selectable virtual elements, according to at least one embodiment of the present disclosure.

FIG. 14 illustrates an example of a virtual environment 430 and an input device 436, which is represented schematically by a user's hand. In some embodiments, a guidance cursor 438 may be presented in the virtual environment 430 at the first position 434. In some embodiments, the tracking of the user's gaze may be insufficient to precisely locate the guidance cursor 438 on the desired virtual element of a plurality of virtual elements 432-1, 432-2, 432-3. In other embodiments, a virtual element may be a small object that is difficult to select with the precision of the gaze-tracking device. The method may optionally include receiving a target engagement input 440 prior to the movement input to decouple the guidance cursor 438 from the first position 434.

Figure 15:
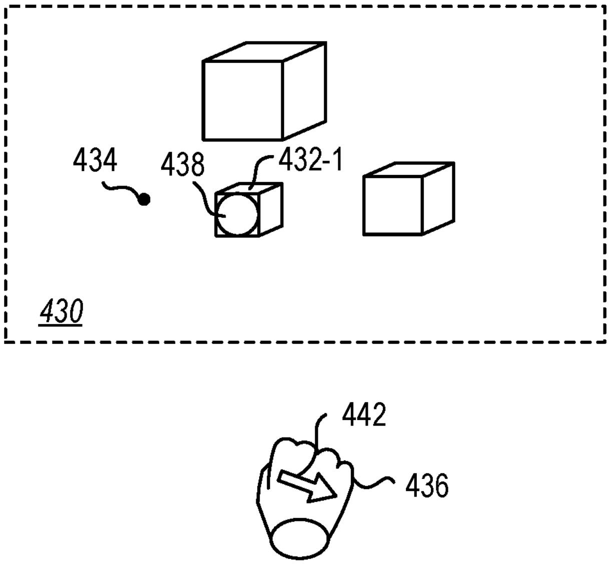
FIG. 15 is a schematic representation of a guidance cursor snapping to a selectable virtual element, according to at least one embodiment of the present disclosure.

FIG. 15 shows the movement input 442 from the input device 436 that snaps the guidance cursor 438 from the first position 434 to the nearest selectable virtual element 432-1 in the virtual environment 430. In some embodiments, the guidance cursor 438 may snap to a selectable virtual element within a maximum range from initial position of the guidance cursor 438. For example, a selectable virtual element may exist in the virtual environment 430 far to the left of the virtual elements 432-1, 432-2, 432-3 illustrated in FIG. 15. The user may not intend to have the guidance cursor 438 leap outside the user's field of view of the virtual environment 430.

In some embodiments, the guidance cursor 438 may snap to a selectable virtual element only within the user's field of view of the virtual environment. In other embodiments, the guidance cursor 438 may snap to a selectable virtual element within 10° of the guidance cursor 438 relative to the user's perspective. In yet other embodiments, the guidance cursor 438 may snap to a selectable virtual element within 6° of the guidance cursor 438 relative to the user's perspective. For example, the selectable virtual element to which the user intends to snap the guidance cursor 438 may be within the user's peripheral vision of the guidance cursor 438. In further embodiments, the guidance cursor 438 may snap to a selectable virtual element within 3° of the guidance cursor 438 relative to the user's perspective. For example, the selectable virtual element to which the user intends to snap the guidance cursor 438 may be within the user's foveal vision. In yet further embodiments, the guidance cursor 438 may snap only to a selectable virtual element at least partially within a cursor area of the guidance cursor 438. For example, the guidance cursor 438 may have a cursor area within a border of the guidance cursor 438 that provides visual feedback as to the virtual elements that may be selected via a snapping functionality.

Figure 16:
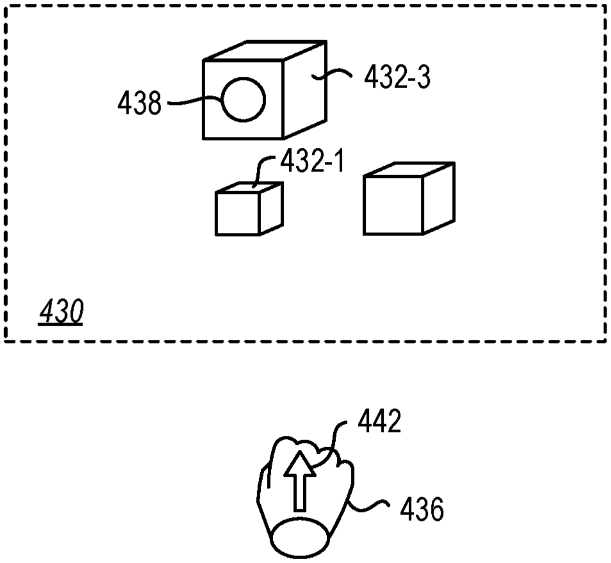
FIG. 16 is a schematic representation of a guidance cursor stepping to a selectable virtual element from the selectable virtual element of FIG. 15.
Figure 17:
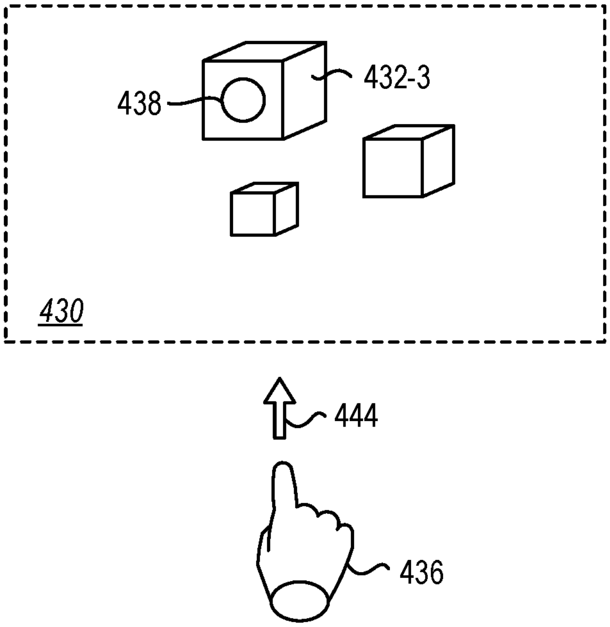
FIG. 17 is a schematic representation of a selection input selecting the selectable virtual element of FIG. 16.

FIG. 16 illustrates stepping between virtual elements using discrete movement inputs. The input device 436 may provide a step input that is a discrete movement input 442 such that the guidance cursor 438 moves in a step direction of the step input from the first selectable virtual element 432-1 to a third selectable virtual element 432-3 of the virtual environment 430. In this manner, a user may "step" through a series of selectable virtual elements until the guidance cursor 438 is positioned on the desired selectable virtual element.

Upon positioning the guidance cursor 438 on the desired selectable virtual element, such as the third virtual element 432-3 shown in the virtual environment 430, the input device 436 may provide a target disengagement input 444 or other selection input to terminate movement and select the third virtual element 432-3 or any other virtual element on which the guidance cursor 438 is positioned.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for improving user interaction with a virtual environment, the method comprising:

presenting a virtual environment to a user with a head-mounted display (HMD), wherein the presented virtual environment does not have a visible cursor;

measuring a first position of a user's gaze relative to the virtual environment using the HMD;

receiving a system engagement input;

presenting a guidance cursor at the first position, in response to receiving the system engagement input;

receiving a target engagement input and decoupling the guidance cursor from the user's gaze;

after receiving the target engagement input, receiving a movement input from a gesture recognition device of the HMD; and smoothly translating the guidance cursor based on the movement input from the gesture recognition device.

2. The method of claim 1, the system engagement input and the target engagement input being received from a single input device.

3. The method of claim 1, the system engagement input, the target engagement input, and the movement input being received from the gesture recognition device.

4. The method of claim 1, further comprising:

measuring a second position of the user's gaze relative to the virtual environment; and when the second position is beyond a threshold distance from the guidance cursor, smoothly translating the guidance cursor through the virtual environment to the second position.

5. The method of claim 1, further comprising:

receiving a system disengagement input, and hiding the guidance cursor.

6. The method of claim 5, the system engagement input and system disengagement input being received from the gesture recognition device.

7. The method of claim 1, the gesture recognition device including a camera of the HMD and wherein the gesture recognition device recognizes a one-handed gesture of a user.

8. A method for improving user interaction with a virtual environment, the method comprising:

presenting a virtual environment to a user with an HMD, wherein the presented virtual environment does not have a visible cursor;

measuring a first position of a user's gaze relative to the virtual environment using the HMD;

presenting a guidance cursor at the first position;

receiving a movement input from a gesture recognition device of the HMD, wherein the movement input has a movement direction; and snapping the guidance cursor on a first selectable object in the virtual environment where the first selectable object is in the movement direction relative to the first position and within a 6° peripheral range from the guidance cursor relative to the user's gaze of the virtual environment.

9. The method of claim 8, the movement input being a one-handed gesture.

10. The method of claim 8, wherein the gesture recognition device includes an outward-facing camera of the HMD.

11. The method of claim 8, the guidance cursor having a cursor area and snapping the guidance cursor to a first selectable object including snapping the guidance cursor to a first selectable object within the cursor area.

12. The method of claim 8, further comprising:

receiving a step input having a step direction, and moving the guidance cursor from the first selectable object to a second selectable object in the step direction relative to the first selectable object.

13. The method of claim 12, the movement input and the step input being received from a single input device.

14. The method of claim 12, the guidance cursor having a cursor area and snap moving the guidance cursor from the first selectable object to a second selectable object including moving the guidance cursor to the second selectable object within the cursor area.

15. The method of claim 8, snapping the guidance cursor on a first selectable object including snapping the guidance cursor on a first selectable object within a 3° foveal range of the guidance cursor relative to the user's view of the virtual environment.

16. A method for improving user interaction with a virtual environment, the method comprising:

presenting a virtual environment to a user on an HMD, wherein the presented virtual environment does not have a visible cursor;

measuring a first position of a user's gaze relative to the virtual environment;

presenting a guidance cursor at the first position;

measuring a second position of the user's gaze relative to the virtual environment; and when the second position is beyond a threshold distance from the guidance cursor, smoothly translating the guidance cursor through the virtual environment to the second position, wherein the threshold distance is less than a 3° foveal range from the guidance cursor relative to the user's view of the virtual environment.

17. The method of claim 16, smoothly translating the guidance cursor including moving the guidance cursor with a constant velocity.

18. The method of claim 16, smoothly translating the guidance cursor including moving the guidance cursor to the second position in no more than 1.0 second.

19. The method of claim 16, smoothly translating the guidance cursor including moving the guidance cursor at a first velocity toward the second position and at a second velocity with a lesser magnitude than first velocity near the second position.

20. The method of claim 16, the guidance cursor having a cursor radius, the threshold distance being at least the cursor radius.

* * * * *